(12) United States Patent
Dhuse et al.

(10) Patent No.: US 10,963,397 B2
(45) Date of Patent: Mar. 30, 2021

(54) HASH TABLE COLLISION RESOLUTION FOR STORAGE UNIT MEMORY

(71) Applicant: International Business Machines Corporation, Armonk, NY (US)

(72) Inventors: Greg R. Dhuse, Chicago, IL (US); Ilya Volvovski, Chicago, IL (US); Ethan S. Wozniak, Park Ridge, IL (US); Ravi V. Khadiwala, Bartlett, IL (US); Jason K. Resch, Chicago, IL (US); Andrew D. Baptist, Mt. Pleasant, WI (US); Praveen Viraraghavan, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 65 days.

(21) Appl. No.: 15/936,343

(22) Filed: Mar. 26, 2018

(65) Prior Publication Data
US 2019/0294557 A1 Sep. 26, 2019

(51) Int. Cl.
 *G06F 12/1018* (2016.01)
 *G06F 3/06* (2006.01)
 (Continued)

(52) U.S. Cl.
 CPC ........ *G06F 12/1018* (2013.01); *G06F 3/0604* (2013.01); *G06F 3/064* (2013.01);
 (Continued)

(58) Field of Classification Search
 CPC .. G06F 12/1018; G06F 16/9014; G06F 3/067; G06F 12/0864
 See application file for complete search history.

(56) References Cited

U.S. PATENT DOCUMENTS

| 7,650,429 B2 * | 1/2010 | Panigrahy | G06F 16/9014 |
| | | | 709/245 |
| 2002/0178341 A1 * | 11/2002 | Frank | G06F 12/0866 |
| | | | 711/216 |

(Continued)

OTHER PUBLICATIONS

Luis Ceze, Lecture 15, Dec. 22, 2014, University of Washington, Lecture 15 CSE 378 Winter 2009, 1-52 http://web.archive.org/web/20141222100740/http://courses.cs.washington.edu/courses/cse378/09wi/lectures/lec15.pdf (Year: 2014).*

(Continued)

*Primary Examiner* — Reginald G Bragdon
*Assistant Examiner* — Curtis James Kortman
(74) *Attorney, Agent, or Firm* — James Nock; Andrew D. Wright; Roberts Calderon Safran & Cole, P.C.

(57) ABSTRACT

A method includes determining, by a storage unit, to place a pointer in a hash table that is stored in local memory of the storage unit. The method further includes executing, by the storage unit, a hash function on addressing information relating to the pointer to produce a hash resultant. The method further includes executing, by the storage unit, a second function on related data to the addressing information or to the pointer to produce an auxiliary resultant. The method further includes storing, by the storage unit, the hash resultant and the auxiliary resultant as an entry in the hash table for the pointer, wherein, when a hash collision occurs with respect to the hash resultant, the storage unit utilizes the auxiliary resultant to resolve the hash collision.

12 Claims, 7 Drawing Sheets

(51) Int. Cl.
*G06F 11/10* (2006.01)
*G06F 16/901* (2019.01)

(52) U.S. Cl.
CPC ............ *G06F 3/067* (2013.01); *G06F 3/0619* (2013.01); *G06F 11/1076* (2013.01); *G06F 16/9014* (2019.01); *G06F 2212/1032* (2013.01); *G06F 2212/657* (2013.01)

(56) References Cited

U.S. PATENT DOCUMENTS

| | | | |
|---|---|---|---|
| 2003/0210689 A1* | 11/2003 | Davis | H04L 45/745 370/389 |
| 2012/0011512 A1* | 1/2012 | Peckham | G06F 9/44521 718/100 |
| 2016/0048332 A1 | 2/2016 | Kimmel et al. | |

OTHER PUBLICATIONS

Xu, S., Lee, S., Jun, S.W., Liu, M., Hicks, J., & Arvind (2016). BlueCache: A Scalable Distributed Flash-based Key-value Store. PVLDB, 10, 301-312. (Year: 2016).*

Gunawardena; Collision Resolution; 2002; 22 pages; http://www.cs.cmu.edu/~ab/15-121N11/lectures/lecture16.pdf; [downloaded from Internet Mar. 21, 2018].

* cited by examiner

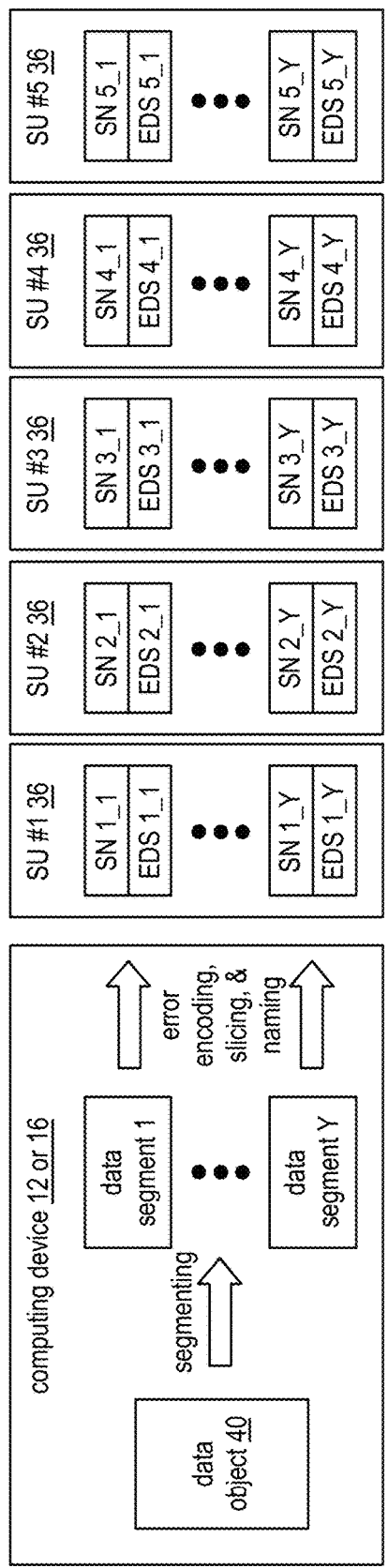

HASH TABLE COLLISION RESOLUTION FOR STORAGE UNIT MEMORY

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

Within a cloud storage system, a storage unit benefits from keeping its pointers to data storage locations in fast memory (typically RAM). This allows the storage unit to retrieve data in as little as one request to its memory device(s). One method of storing these pointers is a hash table, which allow for fast insertions and retrievals of pointers. However, when multiple data items hash to the same location in the hash table, called a hash collision, the storage unit must have a means of dealing with this collision.

A hash collision probability is a function of the number of items currently being stored (M) in the hash table and the capacity of the hash table (N). This function is approximated by $(1-e^{-(M/N)})$. This probability is relatively high even if the number of elements in a set is a fraction of hash field capacity. Current hash collision solutions often induce inefficiencies such as the need to make multiple requests to the memory devices and/or to read additional data from the memory devices.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

DETAILED DESCRIPTION OF THE INVENTION

Figure 1:
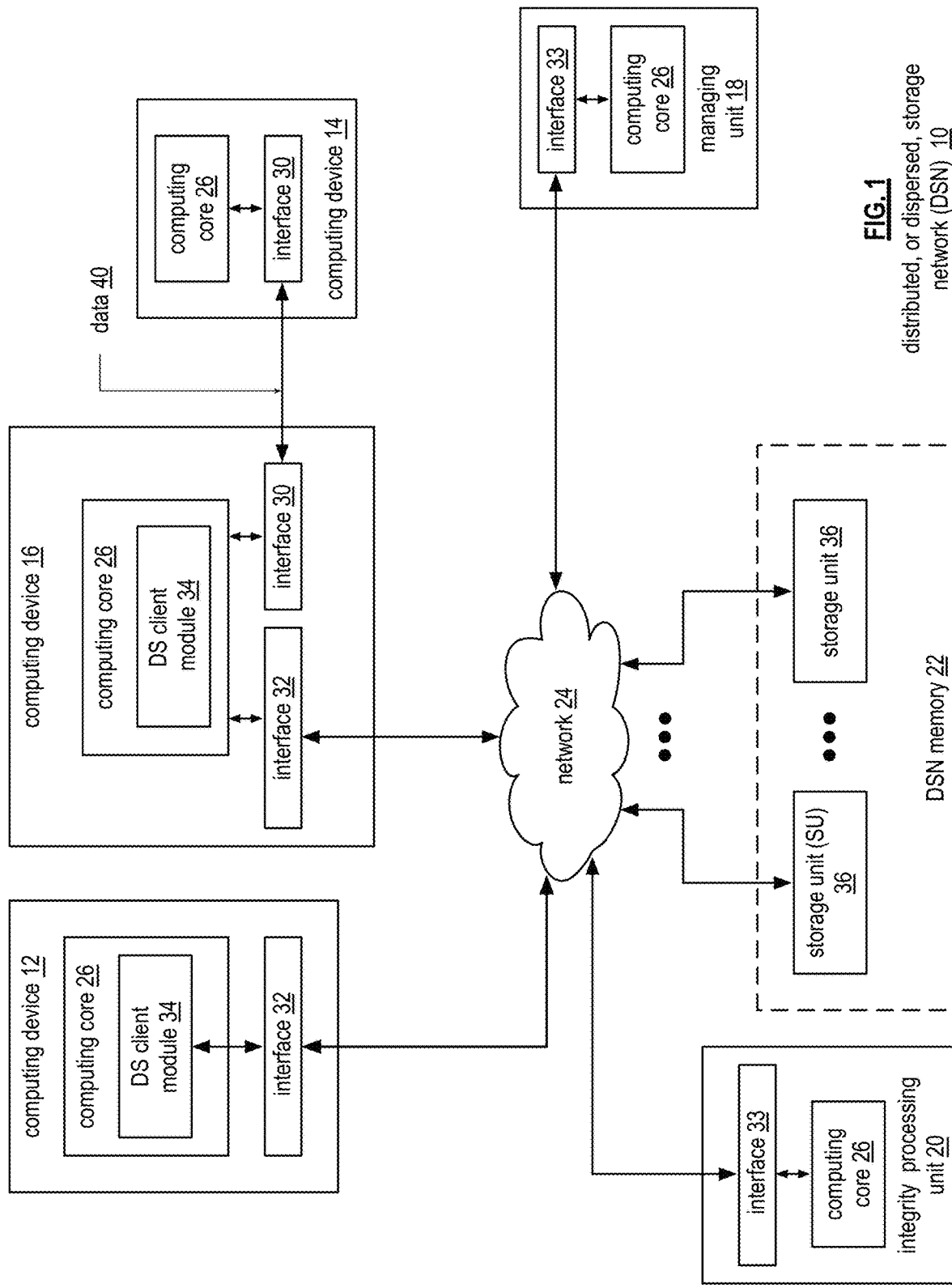
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
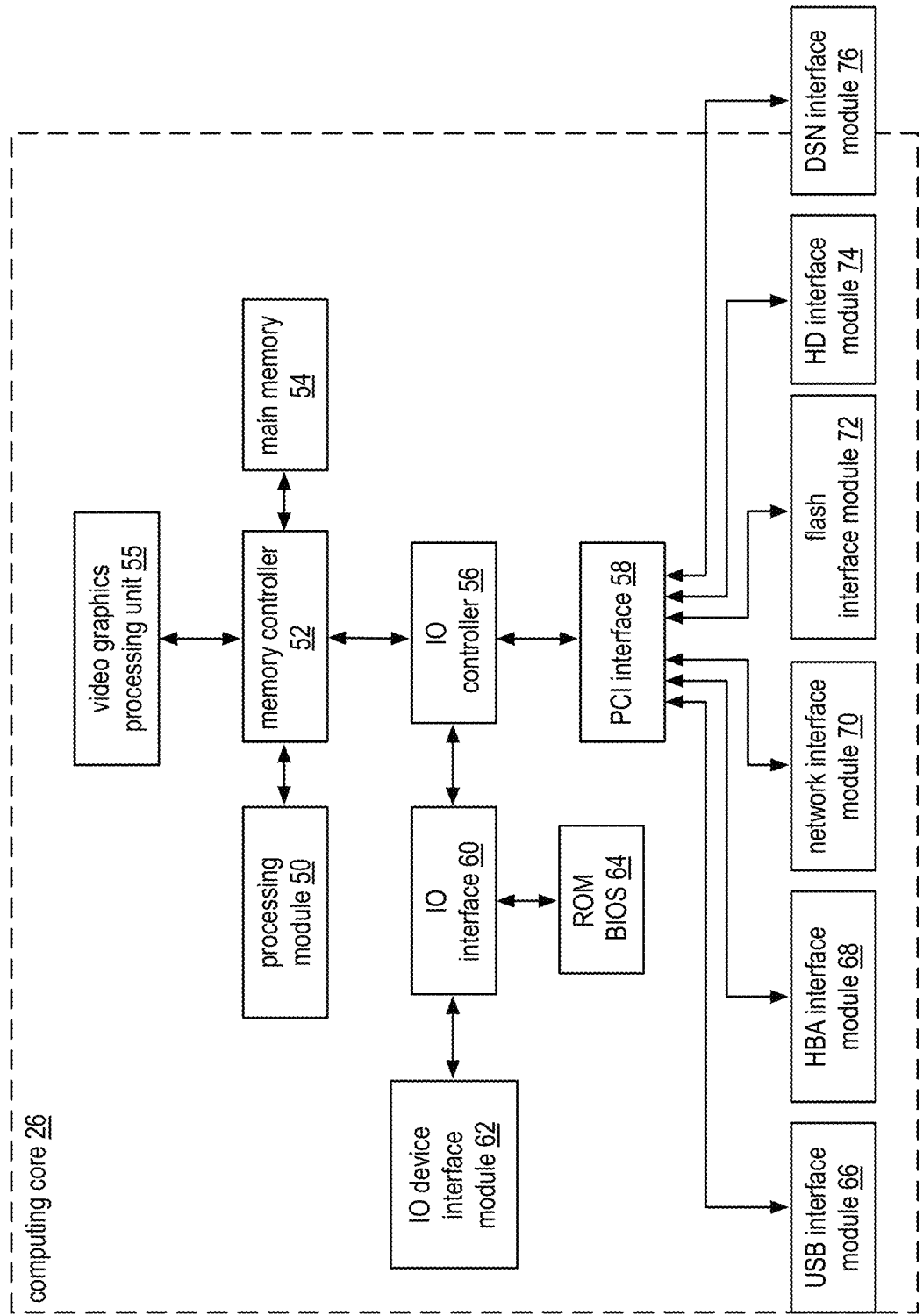
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSTN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSTN managing unit 18 tracks the number of times a user accesses a non-public vault and/or public vaults, which can be used to generate a per-access billing information. In another instance, the DSTN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSTN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 60 is shown in FIG. 6. As shown, the slice name (SN) 60 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
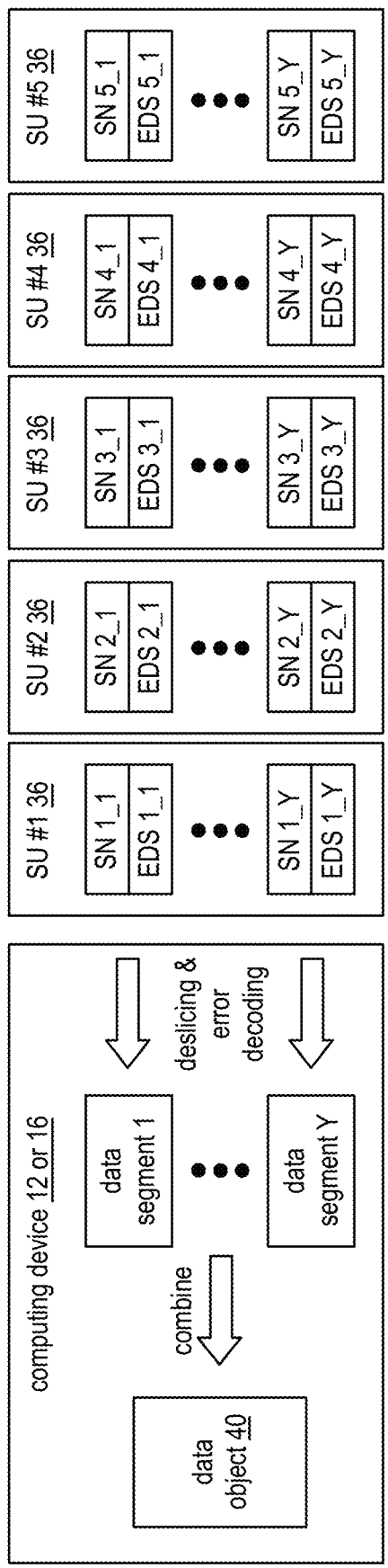
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
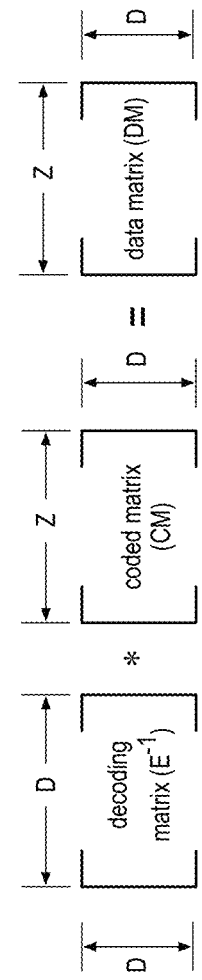
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
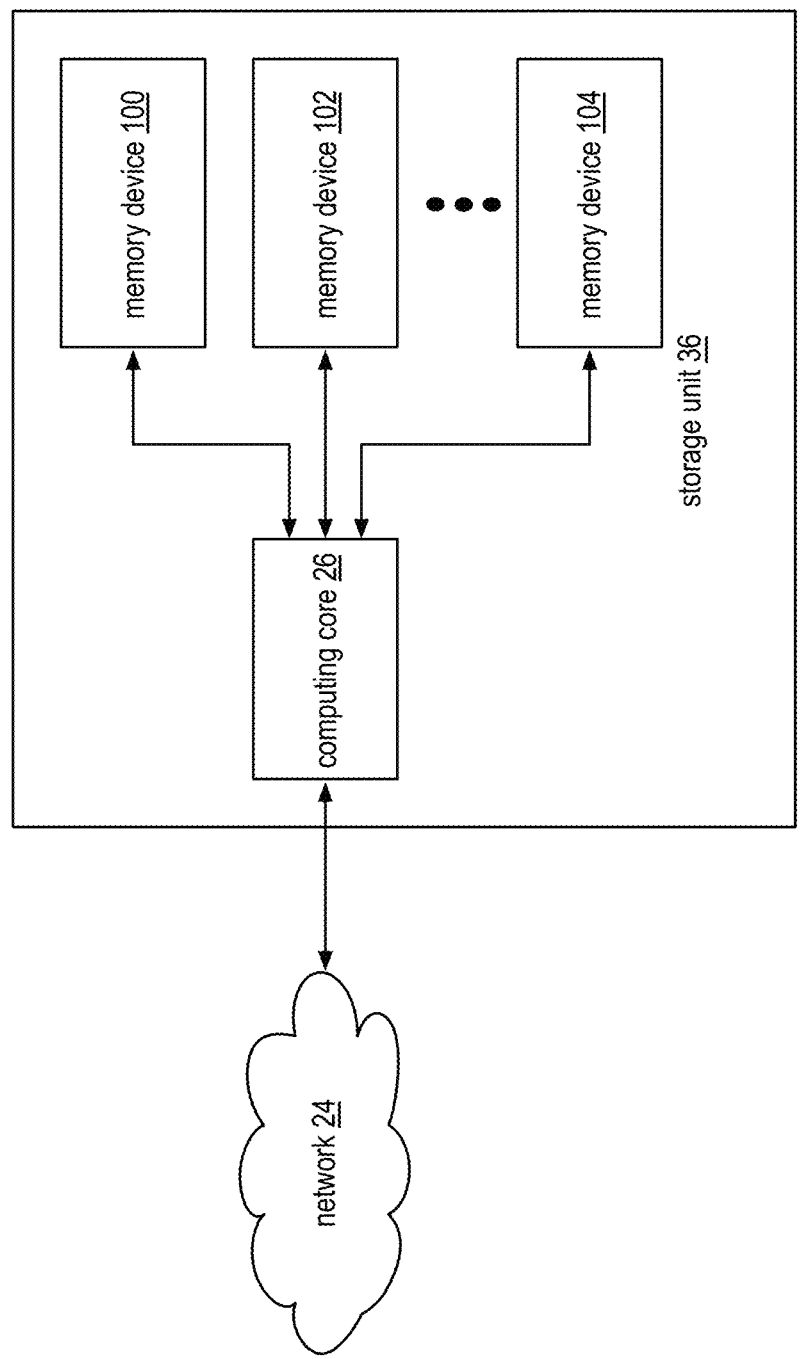
FIG. 9 is a schematic block diagram of an embodiment of a storage unit in accordance with the present invention.

FIG. 9 is a schematic block diagram of an embodiment of a storage unit 36 coupled to the network 24. The storage unit 36 includes a computing core 26 (as described with reference to FIG. 2) and memory devices 100-104. A storage unit 36 may include a few, to tens, to hundreds, to thousands of memory devices depending on the intended uses of the storage unit. The memory devices within the storage unit may be of a variety of types of memory devices or of the same type. For example, a memory type includes read-only memory, random access memory, volatile memory, non-volatile memory, static memory, dynamic memory, flash memory, cache memory, solid state memory, hard drive memory, and/or any device that stores digital information.

Figure 10:
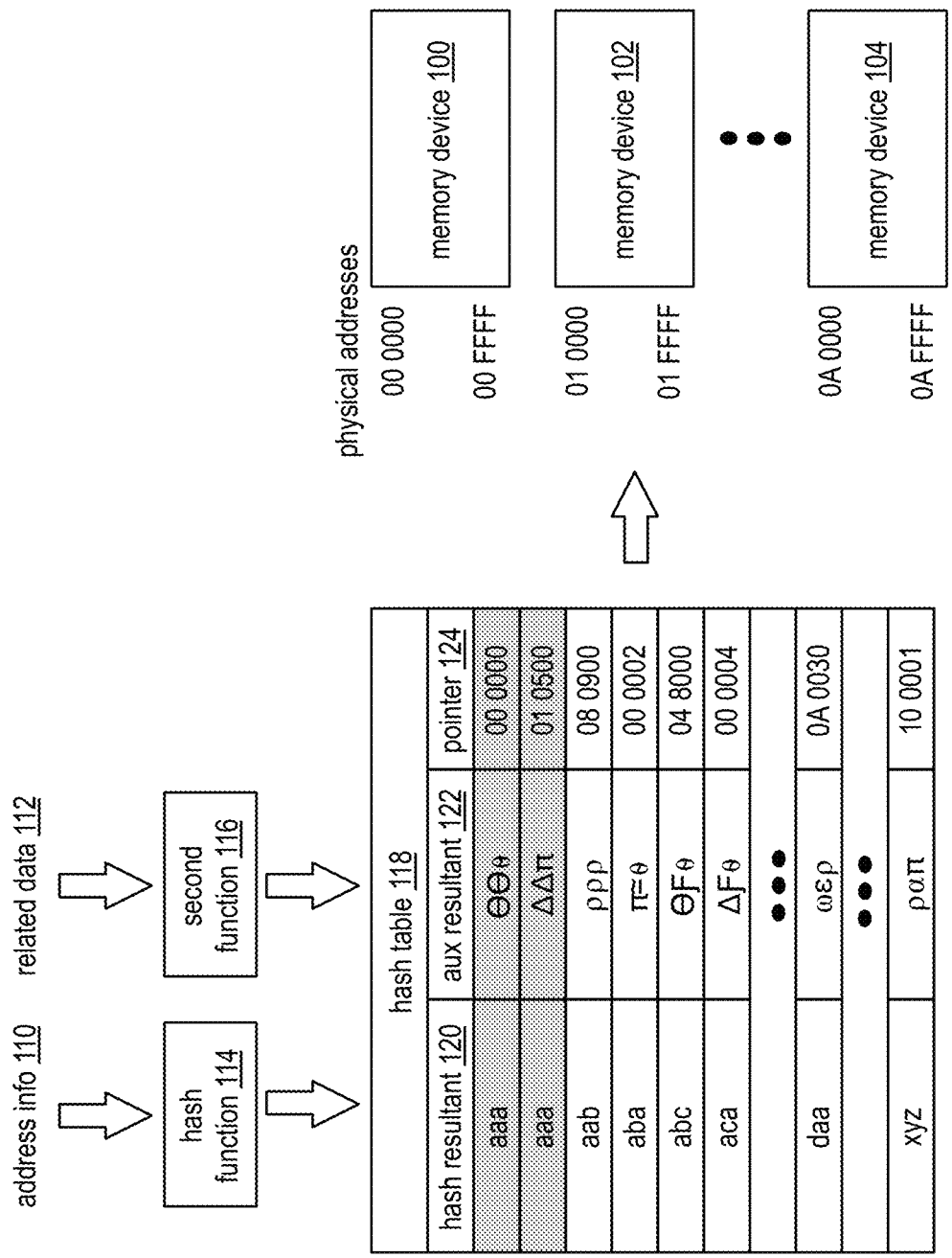
FIG. 10 is a schematic block diagram of an example of creating a hash table that inherently resolves hash collisions in accordance with the present invention.

FIG. 10 is a schematic block diagram of an example of a storage unit creating a hash table 118 that inherently resolves hash collisions. The hash table 118 stores pointers that point to storage locations (e.g., physical addresses) within the storage unit's memory devices 100-104. To create the hash table 118, the storage units 36 executes a hash function 114 on addressing information (e.g., a logical address corresponding to a slice name 80 of FIG. 6) to produce a hash resultant 120. The hash function 114 includes one or more of a cyclic redundancy check function, a checksum function, a universal hash function, a non-cryptographic hash function, a keyed cryptographic hash function, and an unkeyed cryptographic hash function.

In addition, the storage unit performs a second function 116 on related data 112 to produce an auxiliary resultant 122. The second function 116 includes an extension of the hash function 114, a different hash function, a logic function, an arithmetic function, and/or a combination thereof. The related data 112 corresponds to the addressing information 110 and includes a portion of the addressing information, metadata of data associated with the addressing information, a physical address of where the data is to be stored, and/or other data corresponding to the addressing information.

In accordance with a logical to physical addressing map, the storage unit determines a physical address within the memory devices of where the data associated with the addressing information is to be stored. The storage unit creates a pointer 124 for the physical address and creates an entry in the hash table 118. For a particular, pointer 124 (e.g., a particular physical address) an entry in the hash table 118 includes a hash resultant 120, an auxiliary resultant 122, and a pointer 124.

In this example, the storage unit includes eleven memory devices ranging from 00 to 0A (in hexadecimal). For ease of illustration, each memory device includes physical addresses from 0000 to FFFF (in hexadecimal) such that the entire physical address space of the storage unit ranges from 00 0000 to 0A FFFF. The hash table 118 includes several entries that point, via pointers 124, to various physical addresses within the physical address space.

As is also shown in this example, a hash resultant 120 collision occurs for pointer 00 0000 and 01 0500. The hash collision occurs because the hash function 114 yields the same hash resultant 120 ("aaa" in this example) from different address information 110. When the hash collision occurs between hash resultants, the corresponding auxiliary resultants 122 are used to resolve the collision. In this example, ΘΘ| is the auxiliary resultant for pointer 00 0000 and ΔΔπ is the auxiliary resultant for pointer 01 0500. From the hash resultant and the auxiliary resultant, the correct pointer is determined without extra steps and without multiple accesses to the memory devices.

Figure 11:
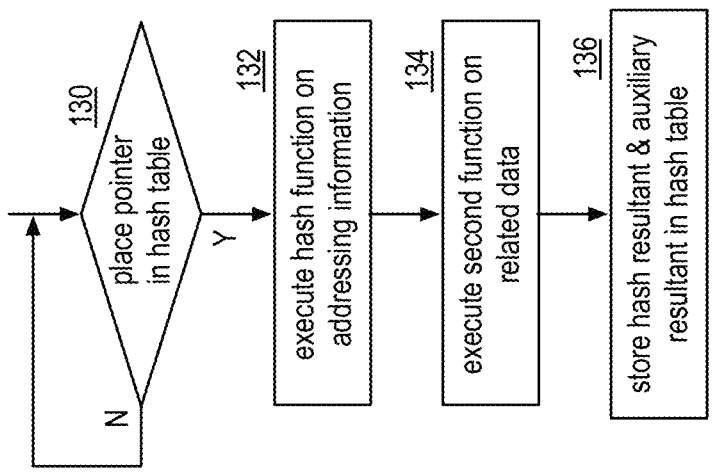
FIG. 11 is a logic diagram of an example of a method for creating a hash table that inherently resolves hash collisions in accordance with the present invention.

FIG. 11 is a logic diagram of an example of a method for creating a hash table that inherently resolves hash collisions. The method is executed by a storage unit and begins at step 130 where the storage units determine to place a pointer in a hash table that is stored in local memory of the storage unit (e.g., in the storage unit's cache memory, main memory, etc.). The storage unit may determine to store a pointer in the hash table for a variety of reasons. For example, the storage unit receives a write request for a data element to be stored in the storage unit and determines to store the pointer in response to the request. As another example, the storage unit receives a read request for a second data element that is to be read from memory of the storage unit and determines to store the pointer in response to the read request, if not already in the hash table. As yet another example, the storage unit performs a data access analysis (e.g., read access rate, write access rate, etc.) to identify frequently used pointers and determines to add the frequently used pointers to the hash table.

When the pointer is to be added to the hash table, the method continues at step 132 where the storage unit executes a hash function on addressing information relating to the pointer to produce a hash resultant. In many instances, the addressing information is a logical address of a storage system that includes the storage unit. In other instances, the addressing information may be a physical address or other information as to where and/or how data associated with the addressing information is to be stored.

The method continues at step 134 where the storage unit executes a second function on related data to the addressing information or to the pointer to produce an auxiliary resultant. For example, the storage unit performs the hash function on the addressing information to produce a first hash value having "x" bits. The storage unit then truncates, as the second function, "y" bits from the "x" bits of the first hash value to produce the auxiliary value. Note that "x" is greater than "y" and that "x-y" bits form the hash resultant. As a specific example, the hash function produces a 16-bit hash value, the first 12 bits provide the hash resultant 120 and the last 4 bits provide the auxiliary resultant 122.

In another example, the storage unit performs a second hash function on the addressing information to produce the auxiliary resultant. In yet another example, the storage unit extracts a source name (e.g., one or more of vault ID, data object ID, and revision information of the slice name of FIG. 6) from the logical address. The storage unit then uses the source name as the auxiliary resultant. Alternatively, the storage unit performs the hash function or another hash function on the source name to produce the auxiliary resultant.

The method continues at step 136 where the storage unit stores the hash resultant and the auxiliary resultant as an entry in the hash table for the pointer. As discussed with reference to FIG. 10 and as will be further discussed with reference to FIG. 12, when a hash collision occurs with respect to the hash resultant, the storage unit utilizes the auxiliary resultant to resolve the hash collision.

Figure 12:
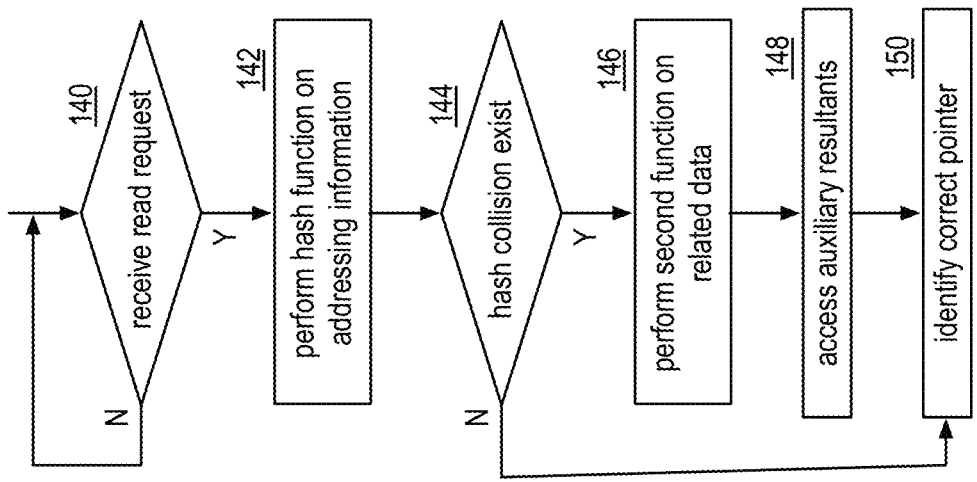
FIG. 12 is a logic diagram of an example of a method of a hash table inherently resolving hash collisions in accordance with the present invention.

FIG. 12 is a logic diagram of an example of a method of a hash table inherently resolving hash collisions. The method begins at step 140 where the storage unit awaits to receive a read request that includes the addressing information (e.g., read a slice name 80 of FIG. 6, which corresponds to a logical address). When the read request is received, the method continues to step 142 where the storage unit preforms the hash function on the addressing information to produce the hash resultant. For example, and with reference to FIG. 10, the storage unit performs the hash function and yields hash resultant "aaa".

The method continues at step 144 where the storage unit determines whether a hash collision exists for the hash resultant. In this example, it does since hash resultant "aaa" is applicable for pointers 00 0000 and 01 0500. As such, the method continues at step 146 where the storage unit performs the second function on the related data to produce a desired auxiliary resultant. As an example, the storage unit produces auxiliary data ΘΘΘ from the related data.

The method continues at step 148 where the storage unit accesses the auxiliary resultants for each hash resultant of the hash collision. With reference to FIG. 10, the storage unit access ΘΘθ as the auxiliary resultant for pointer 00 0000 and ΔΔπ as the auxiliary resultant for pointer 01 0500. The method continues at step 150 where the storage unit identifies a correct point based on the desired auxiliary resultant substantially matching one of the auxiliary resultants. With reference to FIG. 10, the desired auxiliary resultant is ΘΘθ, which matches the auxiliary resultant for pointer 00 0000. Thus, pointer 00 0000 is the correct pointer.

When the hash collision does not exist for the hash resultant, the method continues to step 150 where the storage unit uses the hash resultant to identify the correct pointer. For example, and with reference to FIG. 10, when the hash resultant is "aba", there is no hash collision, thus the storage unit can identify pointer 00 0002 as the correct pointer. As another example, and with reference to FIG. 10, when the hash resultant is "daa", there is no hash collision, thus the storage unit can identify pointer 0A 0030 as the correct pointer.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method that comprises:
    determining, by a storage unit, to place a pointer in a hash table that is stored in local memory of the storage unit, wherein the pointer associates a data element to a physical memory address within the storage unit;
    executing, by the storage unit, a hash function on addressing information relating to the pointer to produce a hash resultant, wherein the addressing information includes one or more of: a logical address of a storage system that includes the storage unit, the physical memory address, and storage information regarding the data element;
    executing, by the storage unit, a second function on related data to the addressing information to produce an auxiliary resultant;
    storing, by the storage unit, the hash resultant, the auxiliary resultant, and the pointer as an entry in the hash table; and
    when a hash collision occurs with respect to the hash resultant, wherein the hash collision occurs when a second entry of the hash table includes a second pointer, a second hash resultant identical to the hash resultant, and a second auxiliary resultant:
    accessing, by the storage unit, the auxiliary resultant and the second auxiliary resultant to identify a desired pointer of the pointer and the second pointer based on a comparison,
    wherein:
        the executing the hash function comprises performing the hash function on the logical address of the addressing information to produce the hash resultant; and
        the executing the second function comprises:
            extracting a source name from the logical address; and
            utilizing the source name as the auxiliary resultant.

2. The method of claim 1, wherein the determining comprises one or more of:
    receiving a write request for the data element to be stored in the storage unit;
    receiving a read request for a second data element that is to be read from memory of the storage unit; and
    performing a data access analysis to identify the pointer as being a frequently used pointer.

3. The method of claim 1, further comprising
    producing a first hash value having "x" bits from the performing the hash function on the addressing information.

4. The method of claim 1, wherein the source name is a data object ID.

5. The method of claim 1, further comprising:
    receiving, by the storage unit, a read request that includes the addressing information;
    determining, by the storage unit, whether a hash collision exists for the hash resultant; and
    when the hash collision exists for the hash resultant:
        performing the second function on the related data to produce a desired auxiliary resultant;
        accessing the auxiliary resultants for each hash resultant of the hash collision; and
        identifying a correct pointer based on the desired auxiliary resultant substantially matching one of the auxiliary resultants.

6. The method of claim 5, further comprising when the hash collision does not exist for the hash resultant, utilizing the hash resultant to identify the correct pointer.

7. A storage unit that comprises:
a main memory;
a network interface;
a plurality of memory devices; and
a processing module operably coupled to the main memory, the network interface, and the plurality of memory devices, wherein the processing module is operable to:
determine to place a pointer in a hash table that is stored in the main memory, wherein the pointer associates a data element to a physical memory address within the storage unit;
execute a hash function on addressing information relating to the pointer to produce a hash resultant, wherein the addressing information includes one or more of: a logical address of a storage system that includes the storage unit, the physical memory address, and storage information regarding the data element;
execute a second function on related data to the addressing information to produce an auxiliary resultant;
store the hash resultant, the auxiliary resultant, and the pointer as an entry in the hash table for use after a hash collision,
wherein the hash collision occurs with respect to the hash resultant when a second entry of the hash table includes a second pointer, a second hash resultant identical to the hash resultant, and a second auxiliary resultant;
access the storage unit after the hash collision utilizing the auxiliary resultant and the second auxiliary resultant to identify a desired pointer of the pointer and the second pointer;
wherein:
the executing the hash function comprises performing the hash function on a logical address of the addressing information to produce the hash resultant; and
the executing the second function comprises:
extracting a source name from the logical address; and
utilizing the source name as the auxiliary resultant.

8. The storage unit of claim 7, wherein the processing module is further operable to determine to place the pointer in the hash table by one or more of:
receiving a write request for the data element to be stored in the storage unit;
receiving a read request for a second data element that is to be read from memory of the storage unit; and
performing a data access analysis to identify the pointer as being a frequently used pointer.

9. The storage unit of claim 7, wherein the processing module is further operable to
produce a first hash value having "x" bits from the performing the hash function on the addressing information to produce a first hash value having "x" bits.

10. The storage unit of claim 9, wherein the source name is a vault ID.

11. The storage unit of claim 9, wherein the processing module is further operable to:
receive, via the network interface, a read request that includes the addressing information;
determine whether a hash collision exists for the hash resultant; and
when the hash collision exists for the hash resultant:
perform the second function on the related data to produce a desired auxiliary resultant;
access the auxiliary resultants for each hash resultant of the hash collision; and
identify a correct pointer based on the desired auxiliary resultant substantially matching one of the auxiliary resultants.

12. The storage unit of claim 11, wherein the processing module is further operable to when the hash collision does not exist for the hash resultant, utilize the hash resultant to identify the correct pointer.

* * * * *